E. T. FIRTH.
DRYING MACHINE.
APPLICATION FILED OCT. 12, 1917.
1,310,824.
Patented July 22, 1919.
4 SHEETS—SHEET 1.
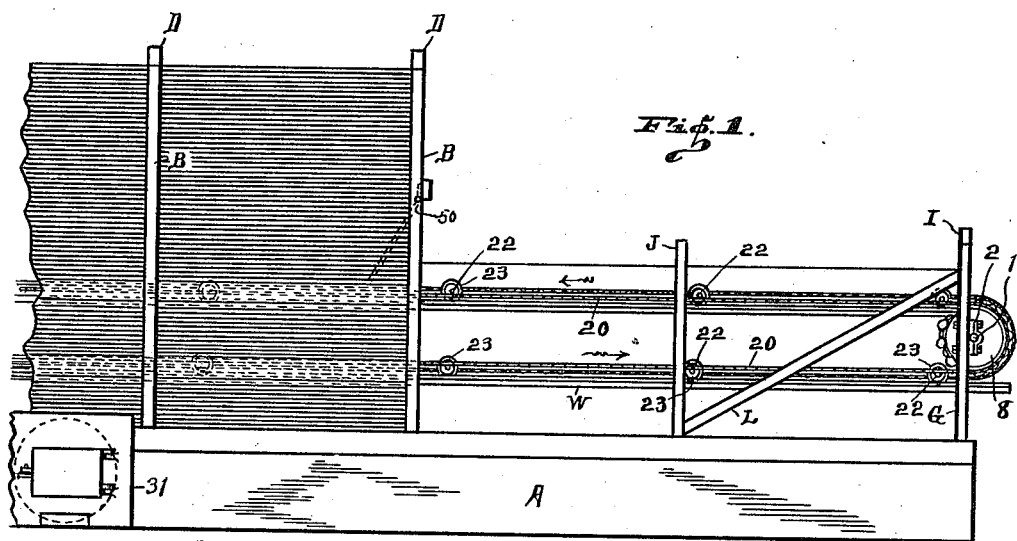
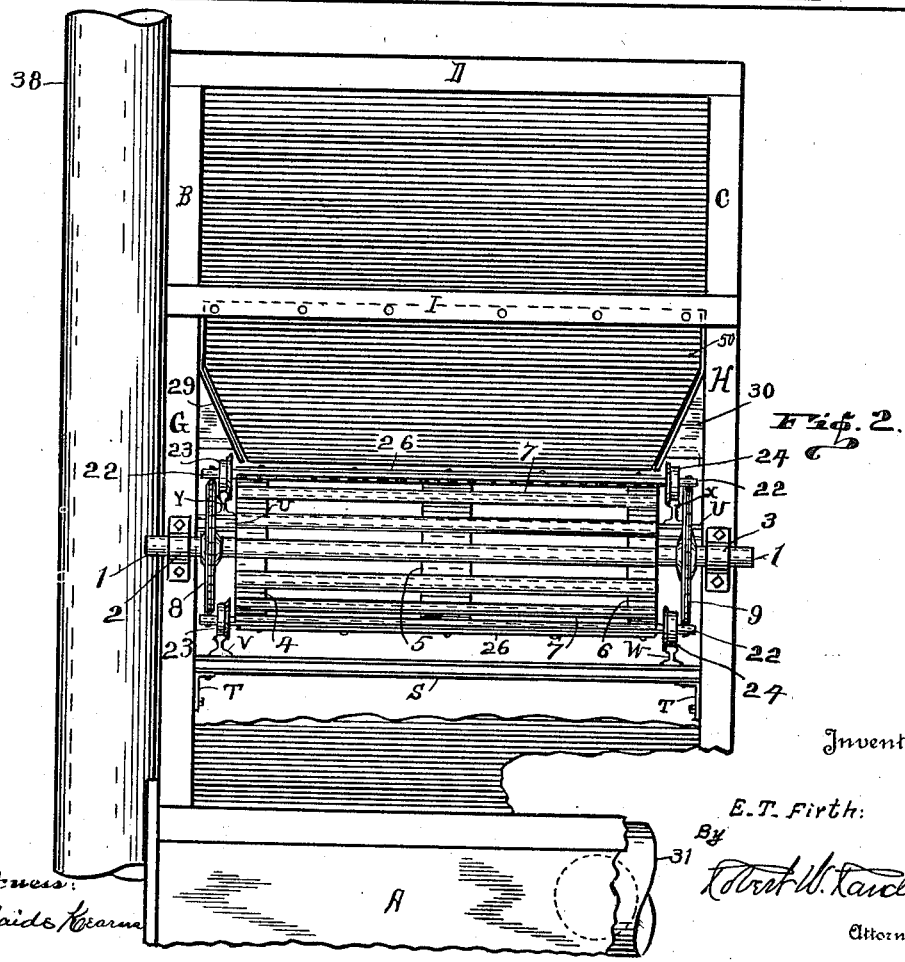
Witness:
Adelaide Kearns
Inventor:
E. T. Firth:
By
Robert W. Kandle,
Attorney.

E. T. FIRTH.
DRYING MACHINE.
APPLICATION FILED OCT. 12, 1917.
1,310,824.
Patented July 22, 1919.
4 SHEETS—SHEET 2.
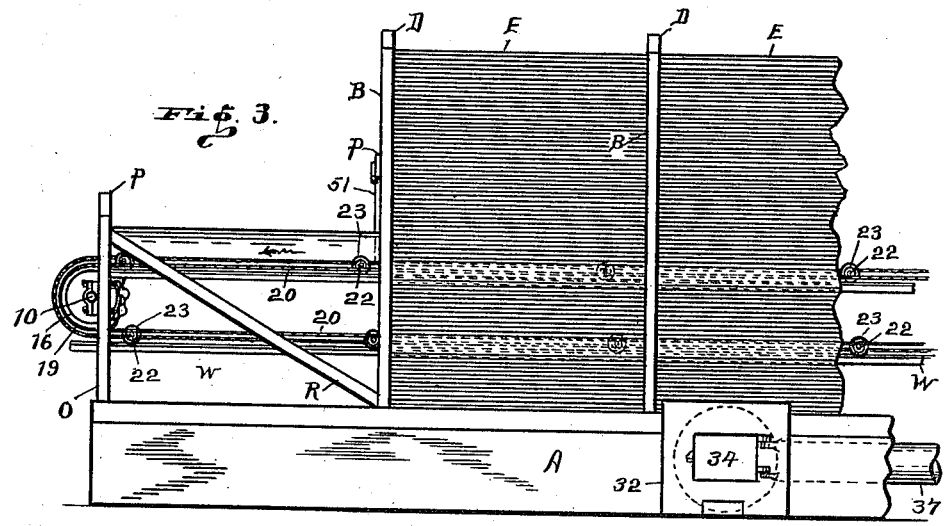
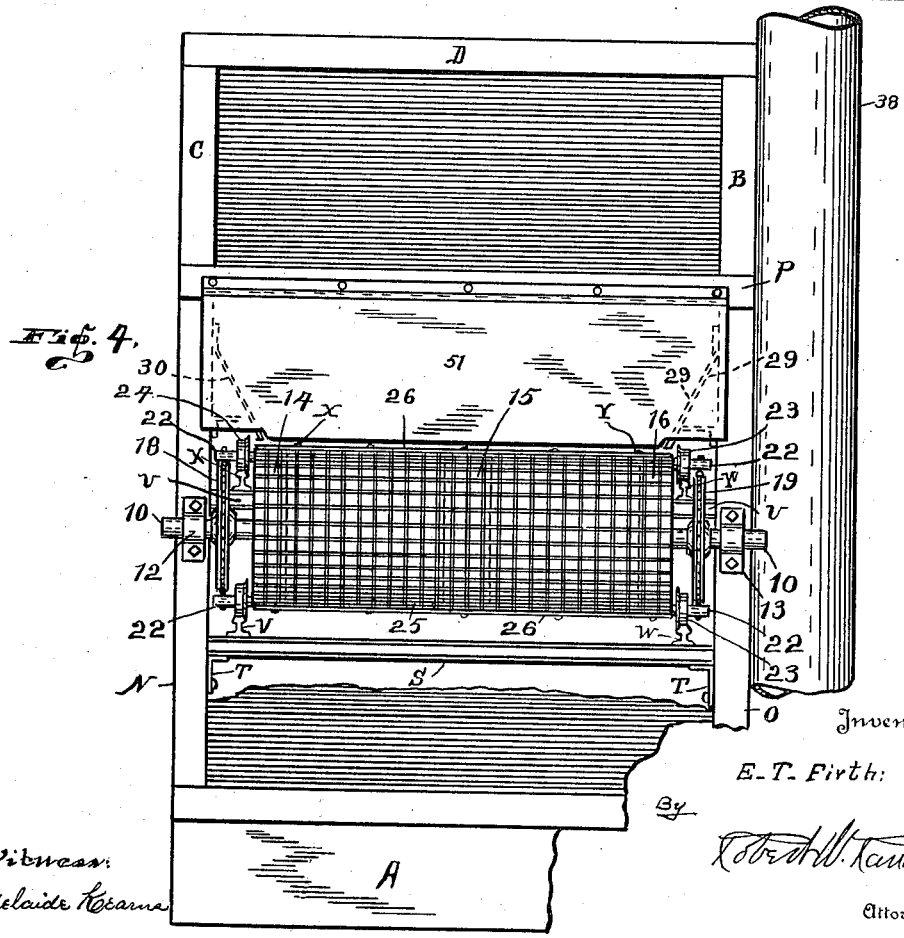

E. T. FIRTH.
DRYING MACHINE.
APPLICATION FILED OCT. 12, 1917.
1,310,824.
Patented July 22, 1919.
4 SHEETS—SHEET 3.
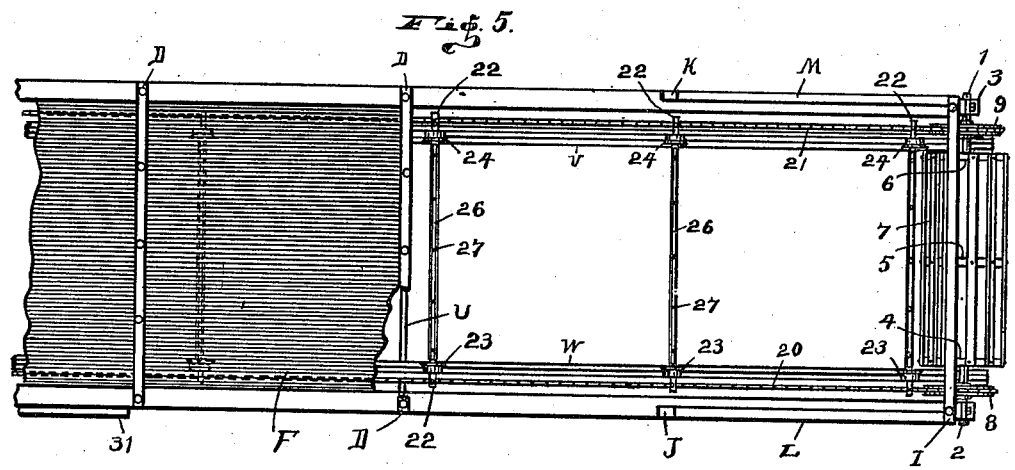
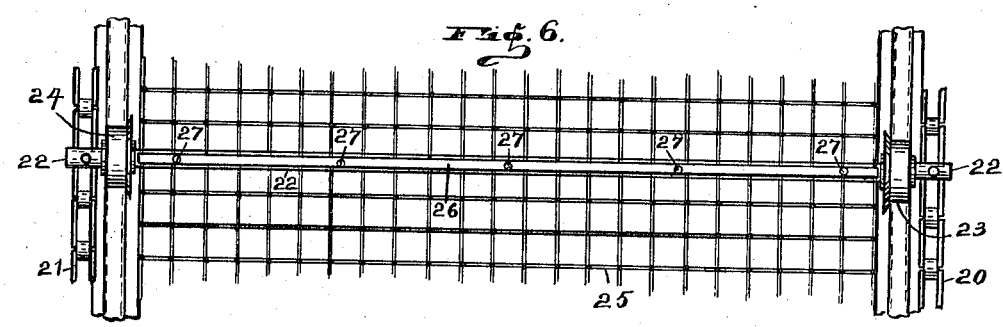
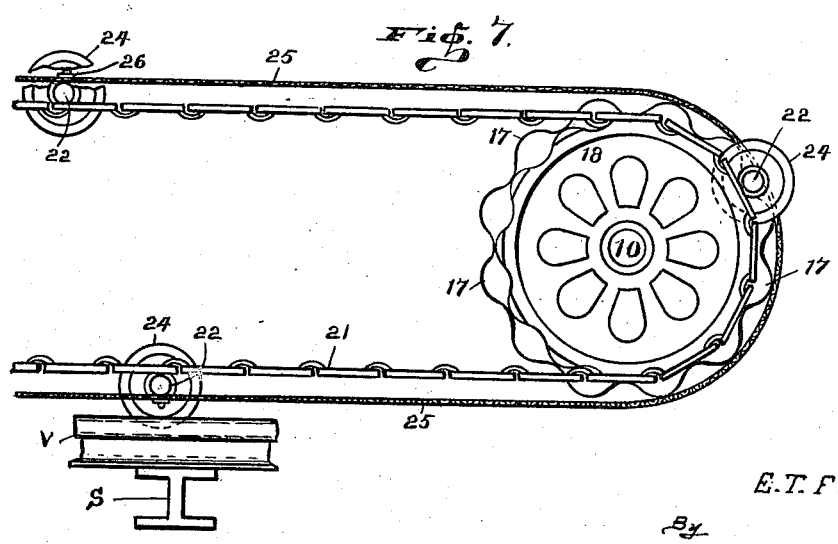
Inventor:
E. T. Firth;
By
Robert W. Kandle,
Attorney.
Witness:
Adelaide Kearns.

E. T. FIRTH.
DRYING MACHINE.
APPLICATION FILED OCT. 12, 1917.
1,310,824.
Patented July 22, 1919.
4 SHEETS—SHEET 4.
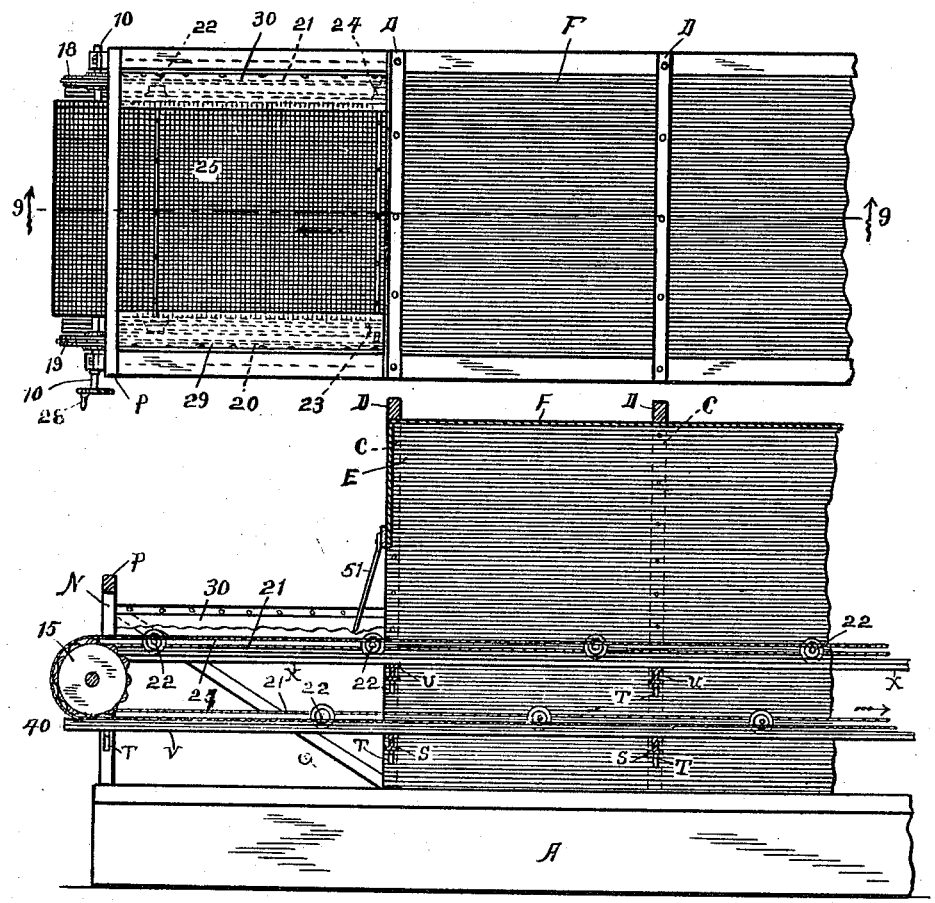
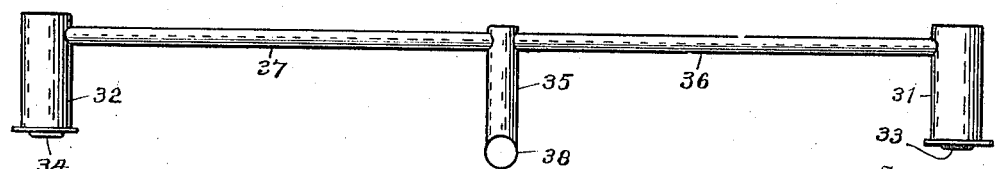

UNITED STATES PATENT OFFICE.

EDWARD T. FIRTH, OF RICHMOND, INDIANA.

DRYING-MACHINE.

1,310,824.　　　　Specification of Letters Patent.　　Patented July 22, 1919.

Application filed October 12, 1917.　Serial No. 196,101.

*To all whom it may concern:*

Be it known that I, EDWARD T. FIRTH, a citizen of the United States, residing in the city of Richmond, in the county of Wayne and State of Indiana, have invented a new and useful Construction for Drying-Machines, of which the following is a full, clear, and comprehensive specification and exposition, the same being such as will enable others to construct and operate the same with precision.

The object of my present invention, broadly speaking, is to provide a drying or desiccating machine which may be of large capacity, easily operated and controlled, quick to accomplish the results for which it is intended, and which can be manufactured and sold at a comparatively low price.

More specifically stated, my object is to provide means to hasten desiccation in grains or other vegetable products, whereby it may be stored or disposed of quickly after being harvested, the products after being treated by my machine being of less weight, making it more easily handled, and at the same time absolutely destroying all insect life but without injury to the grain or seeds for germination or reproduction purposes, although the machine is capable of carrying its process to that point if desired.

In some localities it has been found impossible to hold corn, and other grains, fodder and hay, and various other farm products, except for short periods of time, on account of insects which develop from eggs, or larva, deposited therein or thereon, therefore the principal object of this invention is to so treat the grain or other products that all eggs, larva, and other insect life which may be connected therewith will be absolutely destroyed, and that without injury to the products so treated.

Other minor objects and advantages of the invention will suggest themselves in the course of the following description, and that which is new will be correlated in the appended claim.

The preferred means for carrying out my invention in a practical, mechanical, scientific, and simple manner is shown in the accompanying four-sheets of drawings, in which—

Figure 1 is a front-side elevation of the right-hand portion of my machine. Fig. 2 is a right-hand end elevation of the portion of the machine shown in Fig. 1. Fig. 3 is a front-side elevation of the left-hand portion of the machine. Fig. 4 is a left-hand end elevation of the portion shown in Fig. 3. Fig. 5 is a top plan view of the right-hand portion of the machine. Fig. 6 is a detail plan view of a portion of the conveyer. Fig. 7 is a detail side elevation of a portion of the conveyer and of one of the conveyer drums, as taken from the rear side of the machine. Fig. 8 is a top plan view of the left-hand portion of the machine. Fig. 9 is a vertical longitudinal central section of the left-hand portion of the machine, which may be with equal aptitude considered as showing the right-hand portion of the machine, the said view being taken, for instance, as on the line 9—9 of Fig. 8. And Fig. 10 is a plan view of the heating system alone.

Similar indices denote like parts throughout the several views.

In order that the construction, the operation, and the advantages of my invention may be more fully understood and appreciated, I will now take up a detailed description thereof, in which I will set forth the invention as fully and as clearly as I may.

In the first place it should be understood that the machine should be very long, as compared with its height and width, therefore one should consider Figs. 1 and 3 together, also Figs. 5 and 8 should be considered together, to form a complete machine, but in each instance the oppositely disposed broken ends are connected by portions not shown, but which are mere duplications of the parts which are shown broken.

In practice the end portion, shown in Figs. 1, 2 and 5 is considered as the receiving or feeding end; while the portion shown in Figs. 3, 4 and 8 is considered as the ejecting or delivery end of the machine, but in fact there is no difference in the construction of the two ends, except that the receiving end is formed longer, as to certain parts, in order to facilitate the feeding process, and also the receiving end should be slightly elevated with reference to the delivery end in order to utilize gravity in operation.

The machine includes a base A, which is simply a frame formed by two side sills connected by end sills, and the side sills may be connected by cross-ties (not shown), if desired.

Extending up from the front side of the base are a plurality of posts B; and extending up from the rear side of the base are a plurality of posts C. The posts B and C are arranged in pairs, that is each post C is located opposite to a post B. Each pair of said posts is connected at their upper ends by a stringer D, whereby each pair of posts and their stringer forms a frame, as shown.

The first pair of posts B and C and their stringer D to the right are located centerward from the right-hand end of the base A, the distance being equal to double the distance between each frame, that is between two posts B. And the last pair of posts, B and C, and their stringer D, to the left, are located centerward from the left hand end of the base A, the distance being equal to the distance between each frame. Said relative distances are only approximated as the distances may be varied to meet various conditions.

The tunnel is formed by the corrugated sheet-metal sides E and the top F. The sides E are secured to the inner edges of the posts B and C, and the top F is secured to the under edges of the stringers D, the edges of the top also being secured to the upper edges of the sides.

When constructed as above stated it is apparent that I provide a tunnel extending between the two end frames above mentioned, closed on the sides and the top, and extending down to the ground between the members of the base, and open at each end.

Extending up from the corners of the right-hand end of the base A are the posts G and H, whose upper ends are connected by the stringer I. Also extending up from the front and the rear sides of the base A are the posts J and K, but the upper ends of these are not connected. The posts J and K are located midway of the respective posts G and H and the first posts B. Extending upwardly at angles from near the bases of the posts J and K to near the upper ends of the respective posts G and H are the braces L and M.

Extending upward from the corners of the left-hand end of the base A are the posts N and O, whose upper ends are connected by the stringer P. Extending upwardly at angles from near the bases of the left-hand posts B and C, to near the upper ends of the respective posts N and O, are the braces Q and R. Letter S denotes a plurality of lower cross-ties, there being one of said ties connecting the posts G and H, J and K, and N and O, also one of said ties connects each pair of posts B and C, attached thereto by means of brackets T, as shown in Figs. 2 and 4.

Letter U denotes a plurality of cross-ties, there being one of said ties connecting the posts G and H, J and K, and N and O, also one of said ties connects each pair of posts B and C, attached by means of brackets similar to the brackets T above mentioned.

Resting across on and secured to the ties S are the spaced apart rails V and W, which extend longitudinally of the tunnel.

Likewise resting across on and secured to the ties U are the spaced apart rails X and Y, which are parallel with the first mentioned rails.

The ends of the rails X and Y are located even with the posts G and H, and with the posts N and O; while the rails V and W project outward beyond said posts, as indicated.

All of said rails are parallel with each other, and each pair of rails is of the same gage as the other pair, and they all extend continuously throughout the length of the machine.

The drum of the receiving end of the machine comprises the horizontal shaft 1, which is revolubly mounted in the boxings 2 and 3, which are secured to the right-hand faces of the respective posts G and H. Secured to said shaft, and concentric therewith, are three disks 4, 5 and 6, to whose peripheries are connected a plurality of spaced apart slats 7. Also secured to and concentric with the shaft 1 are the sprocket wheels 8 and 9, the former being located between the disk 4 and the post G, and the latter being located between the disk 6 and the post H.

The drum of the delivery end of the machine comprises the horizontal shaft 10, which is revolubly mounted in the boxings 12 and 13 which are secured to the left-hand faces of the respective posts N and O. Secured to said shaft, and concentric therewith, are the disks 14, 15 and 16, to whose peripheries are connected a plurality of spaced apart slats 17. Also secured around and concentric with the shaft 10 are the sprocket wheels 18 and 19, the former being located between the disk 14 and the post N, and the latter being located between the disk 16 and the post O.

Connecting and passing over the sprocket wheels 8 and 19 is the endless sprocket chain 20. Likewise connecting and passing over the sprocket wheels 9 and 18 is the sprocket chain 21.

The trucks, of which there are a plurality, each comprises an axle 22 having its ends connected to the sprocket chains 20 and 21, as shown most clearly in Fig. 6.

Revolubly mounted on the end portions of each of the axles 22 are the flanged track-wheels 23 and 24, which are adapted to revolve on the said rails, the wheels 23 revolving on the rails W and Y, and the wheels 24 revolving on the rails V and X.

Numeral 25 denotes the conveyer apron, which I prefer to form of square-mesh wire netting. The width of said apron is only slightly less than the distance between the wheels 23 and 24, and the length of said apron is endless, that is it extends around both of the drums, and it contacts with all of said axles 22. Said apron is secured to each of said axles 22 by means of a strip 26 which is attached to the axle by means of rivets, or bolts, 27, with the apron located between the axle and the strip as indicated.

A crank 28 may be detachably connected to the forward end of the shaft 10, whereby the conveyer may be manually operated in the direction indicated by the arrow.

From the above it will be apparent that the upper portion of the apron will travel to the left, and its lower portion will travel to the right, passing around each of the drums, and that it will be supported between said drums by the trucks which are carried therewith and which travel on said rails as above mentioned.

Numerals 29 and 30 denote the respective front and rear guards, each of which extends from end-to-end of the machine, they being secured to the respective posts B and C, from which they extend downwardly and inwardly over the respective wheels 23 and 24 to near the surface of the apron 25, and they prevent the material being treated from working off from the apron 25, and from becoming entangled with track and the track-wheels.

*Heating plant.*—Located near each end of the tunnel and in the inclosure of the base A are the furnaces 31 and 32, whose forward ends project through the front of the base A, and they are provided with the respective fuel-doors 33 and 34. Located across in the central portion of the base is the drum 35. Extending from the rear portions of the furnaces 31 and 32 are the respective conduits 36 and 37, which open into the rear end of the drum 35. Said drum 35 projects forward through the front of the base A, from where it turns upward into the exhaust pipe 38, through which smoke and gases may escape and causing a draft from the furnaces.

Adapted to close the right-hand end of the tunnel is the swinging door 50, which is hinged at its upper edge and is adapted to swing inward. Also adapted to close the left-hand-end of the tunnel is the swinging door 51, which is hinged at its upper edge and it is adapted to swing outward. The material passing in and out automatically open said doors after which they are adapted to close by gravity.

*Modus operandi.*—It will be evident that when fires are maintained in the furnaces that the interior of the tunnel may be heated, the heat rising from the furnaces, from the conduits 36 and 37, and from the drum 35, will pass through the interstices of the apron and will act upon the material under treatment.

It should be noticed that less manual labor will be required if the receiving end of the machine be slightly elevated, with relation to the delivery end of the machine. And before commencing operation there should be fires started in the two furnaces and the tunnel should thereby be brought to the desired degree of temperature for the work to be accomplished.

The material to be treated is deposited on the exposed portion of the apron at the receiving end of the machine (Fig. 1), and then as the crank is turned counter clockwise it is evident that the material will be carried, by the conveyer, through the tunnel in a continuous layer to be therein acted upon by the heat from the fires maintained in the furnaces, the heat being such that the material will be thoroughly desiccated and cured. Then as the material issues from the delivery end of the machine (Fig. 3), it may be lifted from the apron or it may be allowed to turn over the drum as the conveyer makes its turn at that end of the machine.

It should be understood that as the upper portion of the conveyer travels to the left it will be supported, together with the material thereon, by the trucks which travel on the rails X and Y; and as each truck reaches the drum on the left it will leave said tracks and will be carried around by said drum and will take up its return trip, to the right, upon the rails V and W. Upon reaching the right-hand drum the trucks will leave the rails V and W, and after being carried around by the said drum they will again take up their operation upon the rails X and Y, and continue as before as long as the material is being treated.

It is contemplated that if the right-hand end of the machine be elevated slightly, and with the material covering the upper-half of the conveyer, that the gravity will cause the conveyer to travel at the approximate speed to give the desired results, however the speed of the conveyer may be hastened or retarded by means of the crank 28, or other means may be employed for moving the conveyer.

It is contemplated that the speed of the conveyer (which should be very slow), and the degree of heat applied, will be so adjusted as to impart the proper degree of heat to the product which will give the desired results to the finished product.

I have found, in actual practice, that by the process above mentioned that corn, hay, cow-peas, beans, or other vegetable products may be absolutely cured and freed of all insect life and the eggs thereof, and after which it will keep for an indefinite time without deterioration, and that even fruits may be advantageously treated in the same manner.

I desire that it be understood that various changes may be made in the several details of construction and operation, without departing from the spirit of my invention, and without sacrificing any of the advantages thereof which are new and useful.

Having now fully shown and described my invention, what I claim and desire to secure by Letters Patent of the United States, is—

A drying machine comprising a base frame, a main frame extending up from the base, sides and a top covering said main frame and forming a tunnel extending longitudinally through the main frame, an upper set of cross-ties connecting the sides of the frame, a lower set of cross-ties connecting the sides of the frame, tracks carried by the upper set of ties, tracks carried by the lower set of ties, all of said tracks being formed to extend through the tunnel, drums revolubly mounted at each end of the tunnel and midway of the two sets of tracks and located outside of the frame, sprocket chains connecting said drums, an endless conveyer apron formed of wire netting stretched around the two drums and extending through the tunnel, trucks secured to the apron with their wheels adapted to travel on said tracks to carry the apron horizontally through the tunnel, means for revolving said drums to move said apron, guards projecting inward from the sides of the frame over the wheels of the trucks, swinging doors for closing the ends of the tunnel and adapted to swing inward and outward, a heating plant located in the frame and below said apron, and including a furnace located near each end of the machine, a drum extending across the center of machine, conduits connecting the furnaces with said central drum, and an exhaust pipe leading from said central drum, all substantially as shown and described and for the purposes set forth.

In testimony whereof I have hereunto subscribed my name to this specification in the presence of two subscribing witnesses.

EDWARD T. FIRTH.

Witnesses:
R. E. RANDLE,
ROBT. W. RANDLE.

Copies of this patent may be obtained for five cents each, by addressing the "Commissioner of Patents, Washington, D. C."